(12) United States Patent
Lopez-Estrada

(10) Patent No.: US 7,580,905 B2
(45) Date of Patent: Aug. 25, 2009

(54) ADAPTIVE CONFIGURATION OF PLATFORM

(75) Inventor: Alex A. Lopez-Estrada, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 448 days.

(21) Appl. No.: 10/736,657

(22) Filed: Dec. 15, 2003

(65) Prior Publication Data

US 2005/0132371 A1    Jun. 16, 2005

(51) Int. Cl.
*G06F 15/18* (2006.01)

(52) U.S. Cl. .......................... 706/14; 717/108

(58) Field of Classification Search .......... 706/1, 706/15, 45, 21, 23; 700/1, 90; 705/30; 377/44; 370/237; 714/48; 709/202, 226, 203, 238, 709/223; 703/1, 22; 713/153
See application file for complete search history.

(56) References Cited

U.S. PATENT DOCUMENTS

| | | | |
|---|---|---|---|
| 5,835,756 A | 11/1998 | Caccavale et al. | |
| 5,974,462 A | 10/1999 | Aman et al. | |
| 5,987,502 A | 11/1999 | Banks et al. | |
| 6,003,083 A | 12/1999 | Davies et al. | |
| 6,014,700 A | 1/2000 | Bainbridge et al. | |
| 6,067,412 A | 5/2000 | Blake et al. | |
| 6,085,217 A | 7/2000 | Ault et al. | |
| 6,292,822 B1* | 9/2001 | Hardwick | 718/105 |
| 6,393,455 B1 | 5/2002 | Eilert et al. | |
| 6,615,166 B1* | 9/2003 | Guheen et al. | 703/27 |
| 2002/0116441 A1 | 8/2002 | Ding et al. | |
| 2002/0172320 A1* | 11/2002 | Chapple | 377/44 |
| 2002/0174389 A1* | 11/2002 | Sato et al. | 714/48 |
| 2002/0186658 A1* | 12/2002 | Chiu et al. | 370/237 |
| 2003/0069924 A1* | 4/2003 | Peart et al. | 709/203 |
| 2003/0074467 A1* | 4/2003 | Oblak et al. | 709/238 |
| 2003/0115118 A1* | 6/2003 | Reinemann | 705/30 |
| 2003/0120780 A1* | 6/2003 | Zhu et al. | 709/226 |
| 2003/0154266 A1* | 8/2003 | Bobick et al. | 709/223 |
| 2003/0172135 A1* | 9/2003 | Bobick et al. | 709/220 |
| 2003/0217096 A1* | 11/2003 | McKelvie et al. | 709/202 |
| 2003/0225867 A1* | 12/2003 | Wedlake | 709/222 |

FOREIGN PATENT DOCUMENTS

WO    WO 03/062989 A1    7/2003

* cited by examiner

*Primary Examiner*—David R Vincent
*Assistant Examiner*—Kalpana Bharadwaj
(74) *Attorney, Agent, or Firm*—Schwabe, Williamson & Wyatt, P.C.

(57) ABSTRACT

A platform is adaptively configured with one of one or more pre-established configuration parameter values, based at least in part on one or more performance events observed during the platform's execution of a workload.

20 Claims, 4 Drawing Sheets

ADAPTIVE CONFIGURATION OF PLATFORM

TECHNICAL FIELD

The present invention is related to the field of data processing, and in particular, to the adaptation of a data processing platform for different uses.

BACKGROUND

Increasingly, a number of the embedded market segments, such as networking, imaging, industrial computers, and interactive clients, has shifted from utilizing special purpose fixed functionality application specific integrated circuits (ASIC) or components, to standard integrated circuits or components, including general-purpose processors, or platforms with general-purpose processors, input/output peripherals and a "basic" operating system (OS).

However, performance of these general-purpose platforms in the various specific embedded market segments remain a significant issue, as it is difficult, if not virtually impossible, to configure a general-purpose platform for optimal performance in multiple embedded market segments.

BRIEF DESCRIPTION OF THE DRAWINGS

Embodiments of the present invention will be described by way of the accompanying drawings in which like references denote similar elements, and in which.

DETAILED DESCRIPTION OF EMBODIMENTS OF THE INVENTION

In the following description, various aspects of embodiments of the present invention will be described. However, it will be apparent to those skilled in the art that other embodiments may be practiced with only some or all of the described aspects. For purposes of explanation, specific numbers, materials and configurations are set forth in order to provide a thorough understanding of the embodiments. However, it will be apparent to one skilled in the art that other embodiments may be practiced without the specific details. In other instances, well-known features are omitted or simplified in order not to obscure the description.

Various operations will be described as multiple discrete operations in turn, in a manner that is most helpful in understanding the embodiments, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
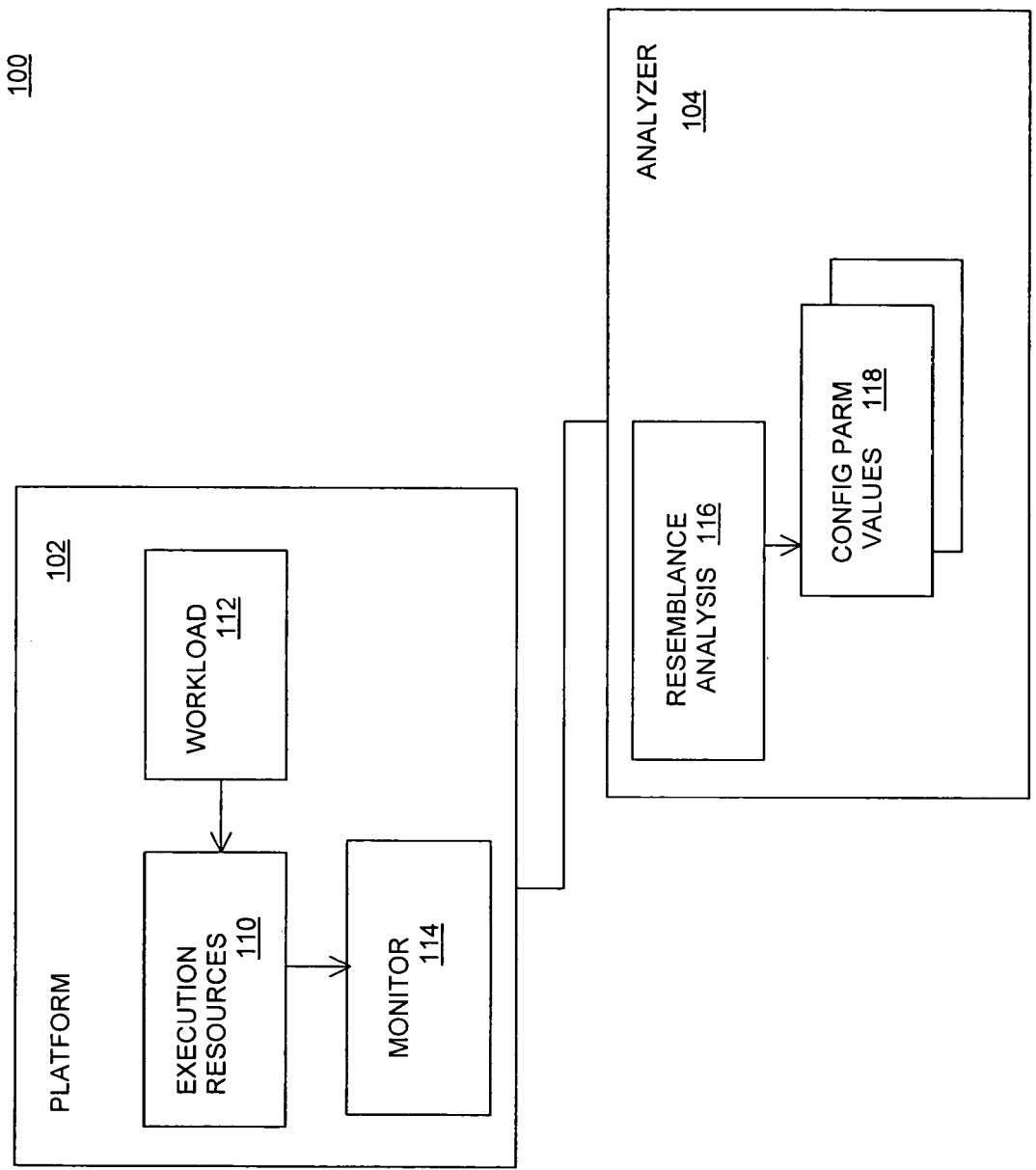
FIG. 1 illustrates an overview of an embodiment of the present invention.

FIG. 1 illustrates an overview of an embodiment of the present invention. As shown, embodiment 100 may include a platform 102 and an analyzer 104 coupled to each other. Platform 102 may include in particular execution resources 110, workload 112 and monitor 114, operatively coupled to each other as shown. Analyzer 104, on the other hand, may include in particular, resemblance analysis function 116 and sets of configuration parameters values 118.

Execution resources 110 may be employed to execute workload 112. Execution resources 110 represent a broad range elements employed to form platforms, including but are not limited to processors, in particular, general-purpose processors, volatile and/or non-volatile storage, I/O peripherals, and OS.

Workload 112 may be any workload, including in particular, but not limited to, those workloads that historically had employed embedded systems, such as networking, imaging, industrial computers, interactive clients, and so forth.

Monitor 114 may be employed to monitor one or more performance events associated with execution of workload 112 by platform 102. The performance events may include events measured by one or more processor, OS and/or chipset counters. Examples of these performance events include, but are not limited to, clockticks, instructions retired, bus accesses, L2 cache misses, load instructions retired, mispredicted branches retired, branches retired, read operations performed, write operations performed, trace cache misses, translation look-aside buffer load, read operation misses, context switches, soft interrupts, and so forth.

Resemblance analysis function 116 of analyzer 104 may be employed to analyze whether workload 112 sufficiently resembles one of one or more reference workloads. As will be described more fully below, in various embodiments, the determination may be based at least in part on the performance events observed during monitoring of platform 102's execution of workload 102, and corresponding performance events during prior executions of the reference workloads.

The one or more reference workloads may be workloads for which configuration parameter values 118 are pre-selected for configuring platform 102 to execute the corresponding workloads. Examples of reference workloads may include, but are not limited to, one or more of a route look-up workload, a OSPF workload, a JPEG codec workload, a 3DES encryption/decryption workload, an AES encryption/decryption workload, an IP packet forwarding workload, a H.323 speech codec workload, and so forth.

Workloads 112 may be actual or representative workloads. In other words, the earlier described monitoring, analyses, and so forth may be performed for an operational platform 102 or a "test" platform 102. Representative workloads may be selected based on the target market segment where the "test" platform 102 will be utilized to resemble "typical" market applications. These workloads may be further categorized by the system components or execution resources 110 they exercise. For example, for processor compute bound applications, the representative workloads utilized may consist of low level functions that execute directly within the processor, i.e. from the processor cache, without exercising peripheral components or agents attached to the processor. For system level applications where multiple components are exercised, as in the case of memory or interrupt bound applications, the representative workloads may be selected to exercise such components.

The configuration parameter values may be pre-established with prior executions of the reference workloads. Examples of configuration parameter values may include, but are not limited to, one or more OS related settings, such as paging size, buffer sizes, memory allocation policies, and so forth, as well as one or more processor related settings, such as whether a second physical processor, logical processor or processing core should be enabled, and chipset related settings, such as arbitration policies. An example approach to pre-determine configuration parameter values will be further described later.

Thus, during operation, execution of workload 112 by platform 102 may be monitored by monitor 114. In particular, monitor 114 may monitor for one or more performance events. The observed performance events may be provided to analyzer 104 to analyze and determine whether platform 102 may be reconfigured to enhance performance.

Still referring to FIG. 1, in various embodiments, each of platform 102 and analyzer 104 may include a networking interface (not shown), coupling platform 102 and analyzer 104 to each other, via a local area network. In alternate embodiments, the networking interfaces may couple platform 102 and analyzer 104 to each other, via a wide area network.

Further, analyzer 104, in various embodiments, may be hosted by a host computing device. Moreover, monitor 114 may be implemented as an integral part of analyzer 104 monitoring platform 102 remotely instead.

On the other hand, in alternate embodiments, analyzer 104 may be an integral part of platform 102.

In yet other embodiments, as will be described in more detail below, analyzer 104 may be practiced without resemblance analysis function 116.

Figure 2:
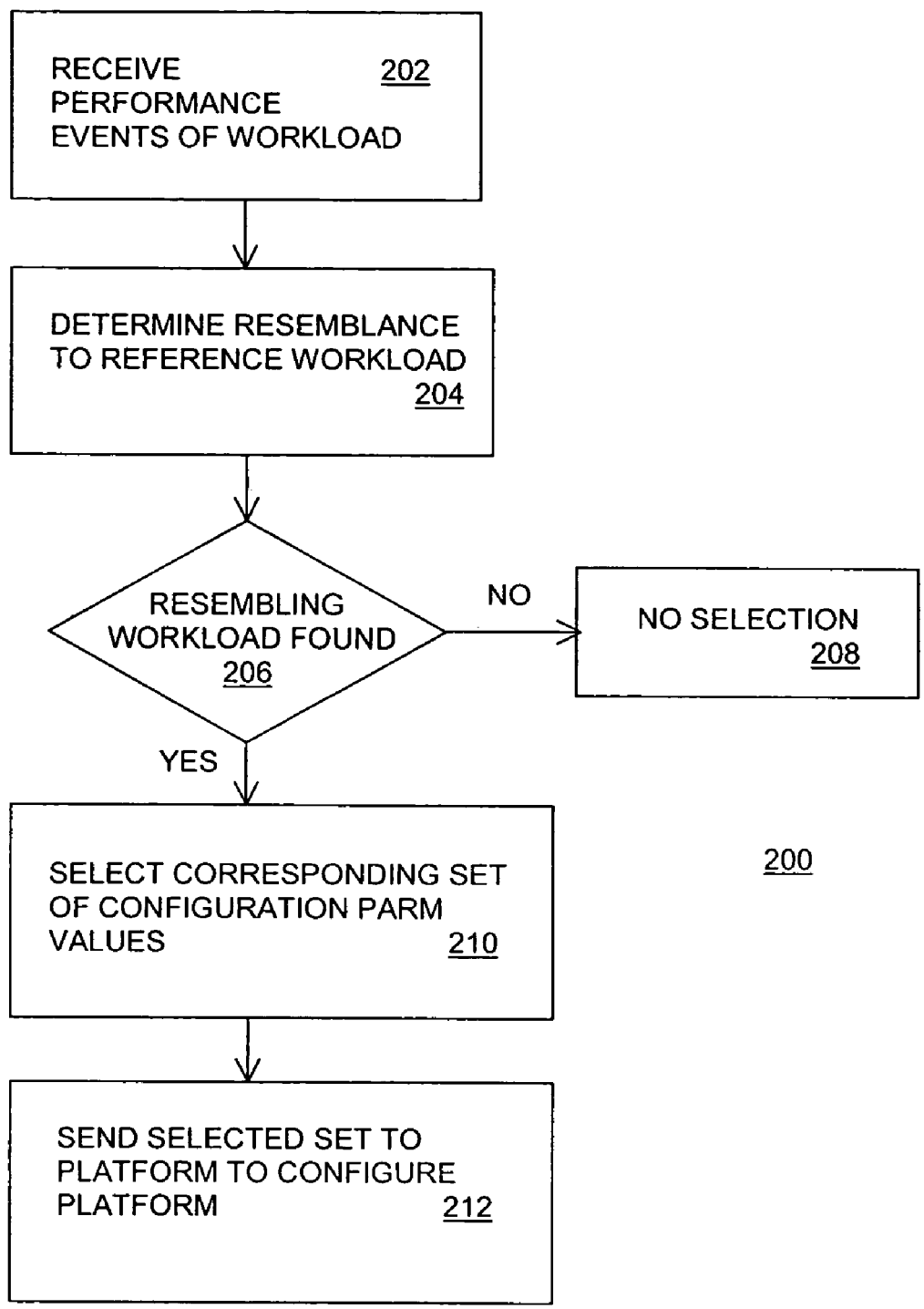
FIG. 2 illustrates a portion of the operational flow of the analyzer of FIG. 1 in selecting a set of configuration parameter values, if appropriate, to configure the platform of FIG. 1, in accordance with one embodiment.

Referring now to FIG. 2, a portion of the operational flow of analyzer 104 in accordance with one embodiment, is illustrated. For the embodiment, analyzer 104 includes resemblance analysis function 116. As shown, on receipt of the performance events from monitor 114, block 202, resemblance analysis function 116 may determine whether workload 112 resembles at least one of the one or more reference workloads, block 204. The determination may be performed based at least in part on the performance events received (i.e. performance events observed during the monitoring), and performance events observed during prior executions of the reference workloads.

If none of the one or more reference workloads is determined to sufficiently resemble workload 112, block 206, no selection is made of the configuration parameter value sets, block 208.

On the other hand, if one of the one or more reference workloads is determined to sufficiently resemble workload 112, block 206, the corresponding set of one or more configuration parameter values 118 may be selected, block 210, and provided 212 to platform 102 to be applied to configure platform 102.

Figure 3:
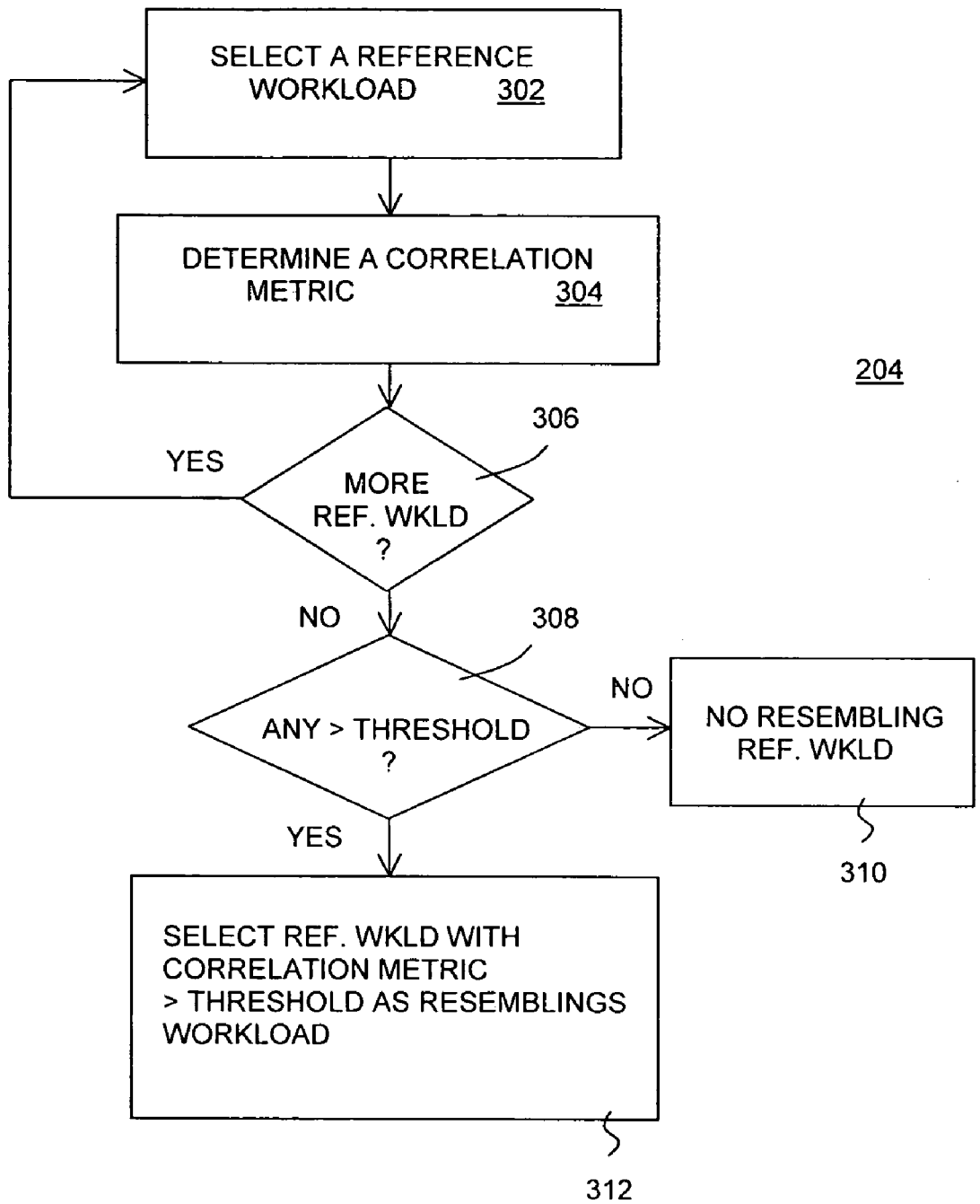
FIG. 3 illustrates a portion of the operational flow in determining whether a workload sufficiently resembles a reference workload, in accordance with one embodiment.

FIG. 3 illustrates a portion of the operational flow of resemblance analysis function (RAF) 116 for determining whether a workload resembles any of the reference workloads, in accordance with one embodiment. As illustrated, RAF 116 first selects one of the reference workloads for analysis, block 302. Then, RAF 116 determines a correlation metric between the workload and the currently selected reference workload, block 304.

In various embodiments, RAF 116 may determine the correlation metric as a ratio between the covariance of the performance events observed during execution of the workload, and observed during prior execution of the reference workload, and the product of the standard deviations of the respective performance events observed. Mathematically, the correlation metric may be expressed as follows:

Let X be a vector corresponding to a set of performance events and $Y_i$ be the $i^{th}$ reference workload vector of performance events. The $i^{th}$ correlation coefficient ($\rho_i$) is given by:

$$\rho_i = \frac{\text{Cov}(X, Y_i)}{sX \cdot sY_i}$$

where Cov(X,Y) is the covariance coefficient, and sX and $sY_i$ are the standard deviations of the vectors X and $Y_i$:

$$\text{Cov}(X, Y_i) = \sum_{n=1}^{N} (x[n] - \overline{x}) \cdot (y_i[n] - \overline{y}_i)$$

$$sX = \frac{1}{N} \cdot \sum_{n=1}^{N} (x[n] - \overline{x})$$

$$sY_i = \frac{1}{N} \cdot \sum_{n=1}^{N} (y_i[n] - \overline{y}_i)$$

where N is the number of events in the vector and $\overline{x}$ and $\overline{y}_i$ are the vector means given by:

$$\overline{x} = \frac{1}{N} \sum_{n=1}^{N} x[n]$$

$$\overline{y}_i = \frac{1}{N} \sum_{n=1}^{N} y_i[n]$$

Under this design, the correlation coefficient will fall between −1.0 and 1.0. The closer a correlation coefficient is to 1.0, the more correlated two vectors are, indicating that both data sets vary together.

Continuing to refer to FIG. 3, for the embodiment, upon determining the correlation metric between the workload and the currently selected reference workload, RAF 116 determines if more resemblance analysis is to be performed for at least one other reference workload. If so, RAF 116 returns to block 302, and continues from there as earlier described.

Eventually, RAF 116 would have computed the correlation metrics for all reference workloads.

At such time, RAF 116 determines whether any of the correlation metrics exceeds a correlation threshold, block 308. If no correlation metric exceeds a correlation threshold, the workload will be considered as having insufficient resemblance to any of the reference workloads, block 310.

On the other hand, if one of the correlation metrics exceeds a correlation threshold, block 308, RAF 116 selects the reference workload with the correlation metric greater than the threshold as the resembled workload, block 312.

Referring back to FIG. 1, as alluded to earlier, in various alternate embodiments, analyzer 104 may be practiced without resemblance analysis function 116. For some of these alternate embodiments, analyzer 104 may be practiced with e.g. a direct lookup function (not shown) instead. The direct lookup function may generate a lookup index based on the performance events observed, and employ the lookup index to lookup (select) one of the one or more sets of pre-established configuration parameter values instead.

The direct lookup function may generate the lookup index by e.g. evaluating an index function in view of the performance events observed. The index function may e.g. be a hashing function. Alternatively, the index function may apply a number of corresponding weights to the performance events observed to generate the index. The corresponding weights may be determined via a number of quantitative techniques, including but are not limited, neural network techniques, co-factor analysis, and so forth.

Additionally, in various embodiments, configuration parameter values may be determined by selecting a combination of configuration parameter values that yield the lowest processor cycles per unit of work performed by a reference workload. More specifically, the configuration parameter values may be pre-determined via Design of Experiments (DOE) techniques such as full-factorial analysis or fractional factorial analysis. In the former case, all possible combinations of the configuration parameters may be assembled in a matrix, and the performance response (e.g. total number of processor cycles incurred) is measured for each combination. The combination that results in the lowest total processor cycles may be selected as the pre-determined configuration parameter values.

To further illustrate, consider an embodiment with 3 configuration parameters: (1) number of logical processors (one or two), (2) memory page sizes (4 KB or 4 MB) and (3) hardware pre-fetch mode (enabled or disabled). The total number of combinations is given by $\text{Levels}^{Num\ of\ Parms}$. For this example, there are a total of 3 parameters, each with 2 levels; therefore, there are a total of $2^3$ or 8 possible combinations. The full factorial matrix is

| Combination | Number of Logical Processors | Memory Page Size | Pre-fetcher Mode | Measured Response (total cycles) |
|---|---|---|---|---|
| 1 | 1 | 4 KB | Enabled | Y1 |
| 2 | 1 | 4 KB | Disabled | Y2 |
| 3 | 1 | 4 MB | Enabled | Y3 |
| 4 | 1 | 4 MB | Disabled | Y4 |
| 5 | 2 | 4 KB | Enabled | Y5 |
| 6 | 2 | 4 KB | Disabled | Y6 |
| 7 | 2 | 4 MB | Enabled | Y7 |
| 8 | 2 | 4 MB | Disabled | Y8 |

In one embodiment, the configuration parameter values that yield the smallest measured response, MIN(Y1, Y2 ..., Y8) are selected as the pre-determined parameter values.

Further, platform 102 may be used for heterogeneous or periodic changed workloads. For example, a set-top box may be used as a DVD player (a video decoding emphasized workload) at one point in time, an audio player (an audio decoding emphasized workload) in another point in time, or web browsing (a TCP/IP and/or encryption/decryption emphasized workload) in yet another point in time, or combinations thereof. Accordingly, the monitoring, analyses, adaptation etc. may be repeated in view of the frequency the workload changes. In other words, the platform may be adapted periodically with a frequency and adaptation pattern that substantially matches the expected change in workload. In alternate embodiments, a weighted approach (based on the expected heterogeneous workload) may be practiced instead.

Figure 4:
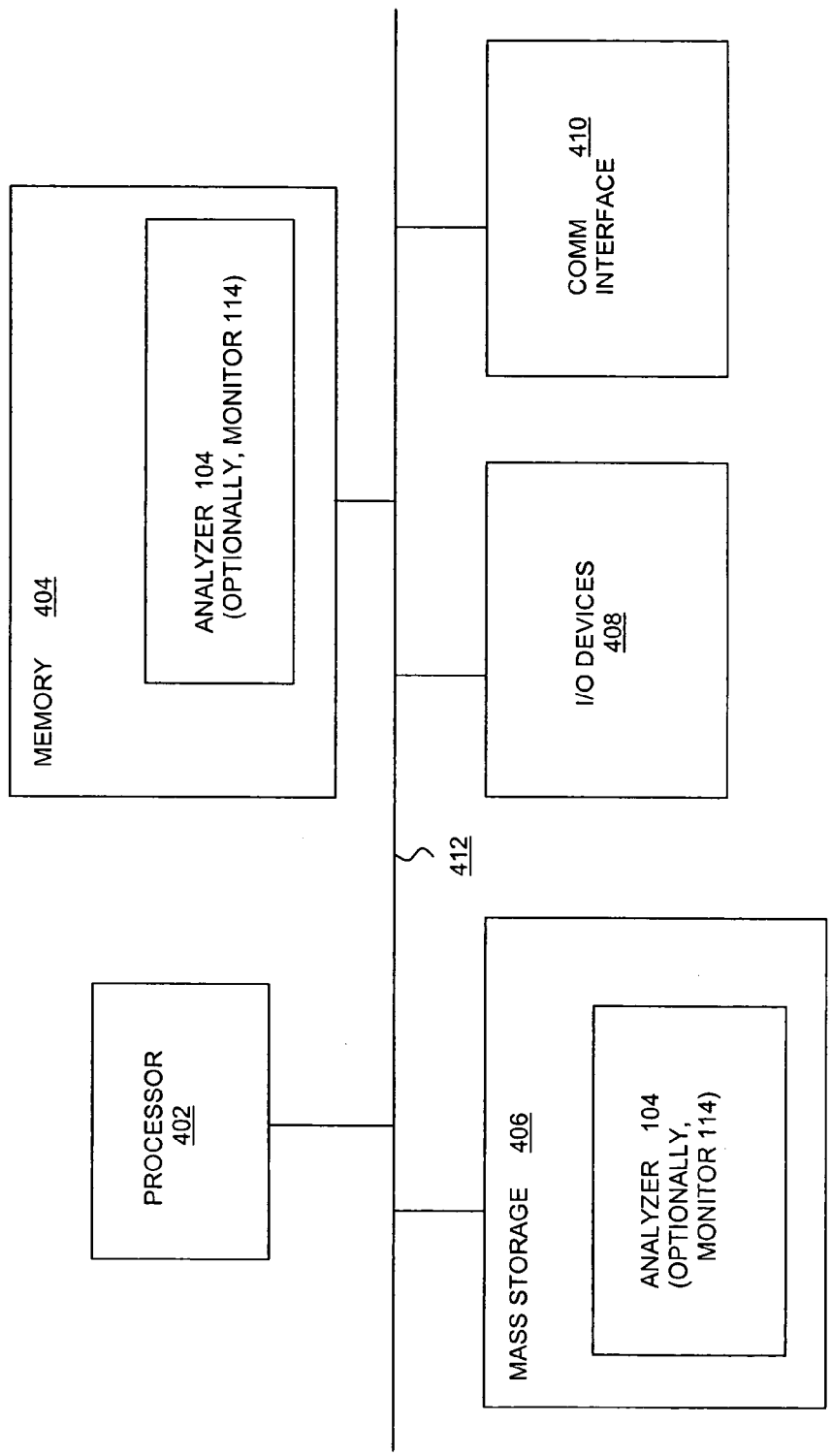
FIG. 4 illustrates a computer system suitable for use to practice one or more aspects of an embodiment of the present invention.

FIG. 4 illustrates a computer system suitable for use to practice one or more aspects of an embodiment of the present invention. As illustrated, computing device 400 may include one or more processors 402, system memory 404, mass storage devices 406, other I/O devices 408 and communication interface 410, coupled to each other via system bus 412 as shown.

Processor 402 is employed to execute a software implementation of analyzer 104, and optionally, monitor 114. Processor 402 may be any one of a number of processors known in the art or to be designed. Examples of suitable processors include but are not limited to microprocessors available from Intel Corp of Santa Clara, Calif.

Memory 404 may be employed to store working copies of analyzer 104, and optionally, monitor 114. Memory 404 may be Dynamic Random Access Memory (DRAM), Synchronous DRAM (SDRAM) or other memory devices of the like.

Mass storage devices 406 may be employed to persistently store data, including e.g. a persistent copy of analyzer 104, and optionally, monitor 114. Examples of mass storage devices 406 include but are not limited to hard disks, CDROM, DVDROM, and so forth.

Other I/O devices 408 may be employed to facilitate other aspects of input/output. Examples of other I/O devices 408 include but are not limited to keypads, cursor control, video display and so forth.

Communication interface 410 may be employed to facilitate e.g. network communication with other devices. For these embodiments, network communication interface 410 may be wired based or wireless. In various embodiments, network communication interface 410 may support one or more of a wide range of networking protocols.

Accordingly, various novel methods and apparatuses for adaptively configuring a platform have been described. While the present invention has been described in terms of the foregoing embodiments, those skilled in the art will recognize that the invention is not limited to the embodiments described. Other embodiments may be practiced with modification and alteration within the spirit and scope of the appended claims. Accordingly, the description is to be regarded as illustrative instead of restrictive.

What is claimed is:

1. A computer-implemented method comprising:
   determining, by a workload analyzer computing system, whether a workload executed or being executed by a platform resembles a reference workload, and said determining comprising:
      correlating each of a plurality of observed performance values to each of a corresponding plurality of reference performance values of the reference workload to produce a correlation metric representing the degree of overall statistical correlation between the plurality of observed performance values and the plurality of reference performance values; and
      determining that the workload resembles the reference workload if the correlation metric exceeds a pre-determined threshold;
   in response to determining that the workload resembles the reference workload, performing, by the workload analyzer computing system, a selected one of
      selecting, by the workload analyzer computing system, a set of one or more configuration parameter values pre-selected for the platform to execute the resembled reference workload and configuring the workload analyzer computing system using the set of one or more configuration parameter values, and
      providing, by the workload analyzer computing system, information about the determined resembled reference workload to facilitate the selection of the set of one or more configuration parameter values pre-selected for the platform to execute the determined resembled reference workload.

2. The computer-implemented method of claim 1, wherein the one or more reference workloads comprise at least a selected one of a route look-up workload, a OSPF workload, a JPEG codec workload, a 3DES encryption/decryption workload, an AES encryption/decryption workload, an IP packet forwarding workload, a H.323 speech codec workload.

3. The computer-implemented method of claim 1, wherein the method further comprises performing a selected one of
receiving by the workload analyzer computing system, the one or more performance events observed during said monitoring; and
said monitoring by the workload analyzer computing system.

4. The computer-implemented method of claim 1, wherein the system comprises the platform; and
the method further comprises the workload analyzer computing system executing the workload and performing said monitoring.

5. The computer-implemented method of claim 1, wherein said performing comprises selecting a set of one or more configuration parameter values pre-selected for the platform to execute the determined resembled reference workload; and
the method further comprises performing a selected one of
applying, by the workload analyzer computing system, the selected set of one or more configuration parameter values to configure the platform, and
providing, by the workload analyzer computing system, information about the selected set of one or more configuration parameter values to facilitate application of the selected set of one or more configuration parameter values to configure the platform.

6. A computer-implemented method comprising:
generating, by a workload analyzer computing system, a lookup index based at least in part on an output of an index function configured to accept as input one or more measured performance values associated with one or more corresponding observed performance events resulting from a platform's execution of a workload;
selecting, by the workload analyzer computing system, one of a one or more pre-established sets of configuration parameter values, based at least in part on the generated lookup index, for application to configure the platform, each of the pre-established sets of configuration parameter values being associated with corresponding reference workloads. and each of the pre-established sets of configuration parameter values having been previously determined to result in a lowest number of processor cycles per unit of work when used to configure a reference platform while executing the corresponding reference workloads; and
configuring the platform according to the selected pre-established set of configuration parameter values.

7. The computer-implemented method of claim 6, wherein the method further comprises performing, by the workload analyzer computing system, a selected one of:
receiving the one or more performance events observed; and
monitoring said execution of the workload by the platform.

8. The computer-implemented method of claim 6, wherein the method further comprises performing, by the workload analyzer computing system, a selected one of
providing information about the selected set of one or more configuration parameter values to facilitate application of the selected set of one or more configuration parameter values to configure the platform; and
applying the selected set of one or more configuration parameter values to configure the platform, the platform being a part of the workload analyzer computing system.

9. An apparatus comprising
storage medium having stored therein programming instructions designed to enable the apparatus to
determine whether a workload executed or being executed by a platform sufficiently resembles a reference workload, the workload comprising a plurality of performance events observed from monitoring the platform's execution of the workload, and the reference workload comprising a plurality of reference performance events collectively characterizing a signature computational task, the plurality of programming instructions designed to enable the apparatus to determine whether the workload resembles the reference workload having instructions to:
correlate each of a plurality of observed performance values to each of a corresponding plurality of reference performance values of the reference workload to produce a correlation metric representing the degree of overall statistical correlation between the plurality of observed performance values and the plurality of reference performance values; and
determine that the workload resembles the reference workload if the correlation metric exceeds a pre-determined threshold, and
upon determining that the workload sufficiently resembles the reference workload, perform at least a selected one of:
select a set of one or more configuration parameter values pre-selected for the platform to execute the determined resembled reference workload and reconfiguring the platform using the set of one or more configuration parameter values, and
provide information about the determined resembled reference workload to facilitate the selection of the set of one or more configuration parameter values pre-selected for the platform to execute the determined resembled reference workload; and
at least one processor coupled to the storage medium to execute the programming instructions.

10. The apparatus of claim 9, wherein the programming instructions are further designed to program the apparatus to perform a selected one of
receive the plurality of performance events observed during said monitoring;
monitor the execution of the workload to observe the plurality of performance events;
provide information about the selected set of one or more configuration parameter values to facilitate application of the selected set of one or more configuration parameter values to configure the platform; and
apply the selected set of one or more configuration parameter values to configure the platform.

11. An apparatus comprising:
a storage medium having stored therein programming instructions designed to enable the apparatus to:
generate a lookup index to one or more pre-established sets of configuration parameter values, based at least in part on an output of an index function configured to accept as input one or more measured performance values associated with one or more corresponding observed performance events associated with a platform's execution of a workload, each of the pre-established sets of configuration parameter values being associated with corresponding reference workloads, and each of the p re-established sets of configuration parameter values having been previously determined to result in a lowest number of processor cycles per unit of work when used to configure a reference platform while executing the corresponding reference workloads; and select one of the one or more pre-established sets of configuration parameter values, based at least in part on the generated lookup index, for application to configure the platform; and at least a processor coupled to the storage medium to execute the programming instructions.

12. The apparatus of claim 11, wherein the programming instructions are further designed to enable the apparatus to perform a selected one of:

receive the one or more performance events observed;
monitor said execution of the workload by the platform;
provide information about the selected set of one or more configuration parameter values to facilitate application of the selected set of one or more configuration parameter values to configure the platform; and
apply the selected set of one or more configuration parameter values to configure the platform, the platform being a part of the system.

13. A system comprising:

a platform to execute a workload and to perform a plurality of performance events associated with the workload;
a monitor, either coupled to or an integral part of the platform, to observe the plurality of performance events; and
an analyzer coupled to the monitor to receive the plurality of performance events observed, and in response, at least contribute to selecting if possible, a set of one or more configuration parameters values for application to configure the platform, based at least in part on the plurality of performance events observed,
wherein the analyzer is adapted to at least contribute by determining whether the workload resembles one of one or more reference workloads, the resembled reference workload having an associated plurality of reference performance events collectively characterizing a particular computational task, said determining comprising:
correlating each of a plurality of observed performance values to each of a corresponding plurality of reference performance values of the reference workload to produce a correlation metric representing the degree of overall statistical correlation between the plurality of observed performance values and the plurality of reference performance values; and
determining that the workload resembles the reference workload if the correlation metric exceeds a pre-determined threshold.

14. The system of claim 13, wherein:
the platform comprises a first networking interface; and
the system further comprises a computing device hosting the analyzer, the computing device including a second networking interface to couple the computing device with the platform via a network connection.

15. An article of manufacture comprising:
a machine readable medium; and
a plurality of programming instructions on the machine readable medium, designed to enable an apparatus to observe one or more performance events associated with a platform's execution of a workload or receive the one or more performance events observed, and to at least contribute in selection of one or more configuration parameters values for application to configure the platform, based at least in part on the one or more performance events observed, wherein the plurality of programming instructions are at least designed to enable the apparatus to:

determine whether the workload resembles one of one or more reference workloads, based at least in part on the received one or more performance events observed, the resembled reference workload to be employed to facilitate said selection of one or more configuration parameter values, the plurality of programming instructions further designed to enable the apparatus to determine whether the workload resembles the reference workload having instructions to:
correlate each of a plurality of observed performance values to each of a corresponding plurality of reference performance values of the reference workload to produce a correlation metric representing the degree of overall statistical correlation between the plurality of observed performance values and the plurality of reference performance values; and
determine that the workload resembles the reference workload if the correlation metric exceeds a pre-determined threshold; or generate a lookup index to one or more pre-established sets of configuration parameter values based at least in part on the output of an index function configured to accept as input one or more measured performance values corresponding to the received observed one or more performance events, to facilitate said selection of one of the one or more pre-established sets of configuration parameter values, each of the pre-established sets of configuration parameter values corresponding to one of the one or more reference workloads, and each of the pre-established sets of configuration parameter values having been previously determined to result in a lowest number of processor cycles per unit of work when used to configure a reference platform while executing the corresponding reference workloads.

16. The method of claim 1, wherein said monitoring the platform's execution of the workload comprises monitoring at least a selected one of a processor performance counter, an OS performance counter, and a chipset performance counter, while the platform executes the workload.

17. The method of claim 1, wherein the plurality of configuration parameter values comprise one or more of processor configuration parameter values, OS configuration parameter values, and chipset configuration parameter values.

18. The method of claim 6, wherein said monitoring the platform's execution of the workload comprises monitoring at least a selected one of a processor performance counter, an OS performance counter, and a chipset performance counter, while the platform executes the workload.

19. The method of claim 6, wherein the one or more configuration parameter values comprise one or more of processor configuration parameter values, OS configuration parameter values, and chipset configuration parameter values.

20. The method of claim 1 wherein the correlation metric is a ratio of:
a covariance of the plurality of observed performance events and the plurality of reference performance events, and
a product of standard deviations of the observed performance values and the reference performance values.

* * * * *

UNITED STATES PATENT AND TRADEMARK OFFICE
CERTIFICATE OF CORRECTION

PATENT NO. : 7,580,905 B2
APPLICATION NO. : 10/736657
DATED : August 25, 2009
INVENTOR(S) : Alex A. Lopez-Estrada It is certified that error appears in the above-identified patent and that said Letters Patent is hereby corrected as shown below:

Column 6
Lines 43-44, "1. ...workload, and said determining..." should read --1. ...workload, said determining...--.

Column 7
Line 5, "2. ..., a OSPF..." should read --2. ..., an OSPF...--.
Line 8, "2. ..., a H.323..." should read --2. ..., an H.323...--.
Line 49, "6. ...workloads. and..." should read --6. ...workloads, and...--.

Column 9
Line 3, "11. ...the p re-established..." should read --1. ...the pre-established...--.

Column 10
Line 41, "16. The method of claim 1, ..." should read --16. The computer-implemented method of claim 1, ...--.
Line 46, "17. The method of claim 1, ..." should read --17. The computer-implemented method of claim 1, ...--.
Line 50, "18. The method of claim 6, ..." should read --18. The computer-implemented method of claim 6, ...--.
Line 55, "19. The method of claim 6, ..." should read --19. The computer-implemented method of claim 6, ...--.
Line 59, "20. The method of claim 1, ..." should read --20. The computer-implemented method of claim 1, ...--.

Signed and Sealed this
Seventh Day of June, 2011

David J. Kappos
*Director of the United States Patent and Trademark Office*